United States Patent [19]

Niitsuma

[11] Patent Number: 5,164,712
[45] Date of Patent: Nov. 17, 1992

[54] X-Y DIRECTION INPUT DEVICE

[75] Inventor: Hirofumi Niitsuma, Iwaki, Japan

[73] Assignee: Alps Electric Co., Ltd., Tokyo, Japan

[21] Appl. No.: 564,810

[22] Filed: Aug. 8, 1990

[30] Foreign Application Priority Data

Aug. 31, 1989 [JP] Japan .................. 1-101069[U]

[51] Int. Cl.⁵ .................................... G09G 3/02
[52] U.S. Cl. .................................. 340/706; 340/709
[58] Field of Search ................ 340/706, 709, 710; 178/18; 74/471 XY, 471 R; 273/148 B

[56]   References Cited
U.S. PATENT DOCUMENTS

| | | | |
|---|---|---|---|
| 3,799,049 | 1/1989 | Avila | 340/710 |
| 3,823,634 | 4/1989 | Culver | 340/710 |
| 4,712,101 | 12/1989 | Culver | |
| 4,896,554 | 1/1990 | Culver | 340/710 |
| 4,928,093 | 5/1990 | Rahman | 340/709 |
| 4,937,564 | 6/1990 | Oberg | 340/710 |
| 4,982,618 | 1/1991 | Culver | 340/710 |

*Primary Examiner*—Ulysses Weldon
*Assistant Examiner*—M. Fatahiyar
*Attorney, Agent, or Firm*—Guy W. Shoup; B. Noel Kivlin

[57]   ABSTRACT

Disclosed is an X-Y direction input device for moving a cursor on a screen in a suitable direction, the device comprising a rotatable rotation operating member, a first rotary type electric part for detecting a rotational amount of the rotating operating member, a slide operating member capable of being reciprocated in a direction of a rotational axis of the rotation operating member, and a second rotary type electric part for detecting an amount of movement of the slide operating member.

4 Claims, 9 Drawing Sheets

X-Y DIRECTION INPUT DEVICE

BACKGROUND OF THE INVENTION

1. Field of the Invention

The present invention relates to X-Y direction input devices for moving a cursor on a screen in a suitable direction, and more particularly to an X-Y direction input device suitably mounted on a keyboard.

2. Prior Art

As an X-Y direction input device for moving and controlling a cursor displayed on a screen of a display device in a suitable direction, a device called "mouse" has been heretofore known. This "mouse" is an X-Y direction input device in which when an operator moves a case housing a ball therein on a base, signals in X and Y directions are removed by the rotation of the ball, and a cursor on the screen is moved to a suitable position in response to these signals.

However, in such an X-Y input device as described above, it is necessary for an operator who has to operate operation keys on the keyboard to move his hand from the keyboard to the mouse whenever the cursor is controlled, which involves a difficulty in operability. Furthermore, since it requires a exclusive-use base for moving the mouse there was a problem in that an area occupied by the whole graphic display is increased.

In view of the foregoing, the present applicant has previously proposed, in order to overcome these problems noted above, an X-Y direction input device which can be incorporated into a keyboard as disclosed in Japanese Utility Model Application Laid-Open Publication Nos. 9839/62 and 62-28251, etc. In the X-Y direction input device according to these proposals, a drive shaft is support interiorly of a keyboard so that an cylindrical operating member spline-coupled to the drive shaft slides along the drive shaft whereby a displacement in a X direction whereas the drive shaft is rotated in association with the rotation of the operating member whereby a displacement in a Y direction is detected.

According to the X-Y input device proposed by the present applicant as described above, the cylindrical operating member exposed from the top surface of the keyboard is rotated or slid by a finger to thereby detect displacements in X and Y directions according to the operated amount of the operating member. Therefore, the operator can perform the key operation of the keyboard and the position control of the cursor with an integral feeling, thus providing merits of the operability and occupying space.

In a case where various switches similar to the "mouse" such as menu selection switches, cancel switches, and the like are mounted on the X-Y direction input device as mentioned above using the operating member, better operability may be obtained by letting the operating member itself have a function equal to the key top instead providing the key top outside an area of movement of the operating member. However, where the switches are driven by the pressing force to the operating member, when the operating member is slid or rotated, these movements have to be transmitted to rotary type electric parts such as rotary encoders, rotary volumes and the like, and also, when the key top of the operating member is operated, a power transmission between the operating member and the rotary type electric parts has to be maintained. This requires some kind of device.

SUMMARY OF THE INVENTION

In view of the actual circumstances of the aforementioned prior art and demands, the present invention has its object to provide an X-Y direction input device which despite the fact that a slide operating member and a rotation operating member have a function as a key top for driving switches, can positively transmit the operated amount of these operating members to rotary type electric parts, thus providing a good operability and less malfunction.

For achieving the aforesaid object, the invention provides an X-Y direction input device comprising a rotatable rotation operating member, a first rotary type electric part for detecting a rotational amount of said rotation operating member, a slide operating member capable of reciprocation in a direction of a rotational axis of said rotation operating member, and a second rotary type electric part for detecting an amount of movement of the slide operating member, in which a cursor displayed on a display device is moved in a suitable direction according to operation amounts of said rotation operating member and said slide operating member, characterized in that said rotation operating member is rotatably placed on said slide operating member, and slide operating member being held on a first drive member for reciprocation, said first rotary type electric part and a drive shaft spline-coupled to said rotation operation member being supported on said first drive member, a rotation operating shaft of said first rotary type electric part is resiliently urged against the drive shaft, said second rotary type electric part being supported on said second drive member, a rotation operating shaft of said second rotary type electric part is resiliently urged against said slide operating member, a print substrate with a plurality of switches mounted thereon is secured to a housing, and said first and second drive members are pivotably supported on said housing.

When the rotation operating member is rotated or the slide operating member is slid, amounts of movement thereof are detected by the first and second rotary type electric parts, respectively, and a cursor on a screen can be moved and controlled to a suitable position. On the other hand, when a force in a pressing direction is applied to these rotation operating member and slide operating member, the first and second drive members are pivotally rotated by said pressing force to turn switches on, and a position of the cursor is inputted according to its ON signal. In this case, the first and second rotary type electric parts are swung integrally with the first and second drive members, and a relative displacement is not present between the first rotary type electric part and the drive shaft and between the second rotary type electric part and the slide operating member.

BRIEF DESCRIPTION OF THE DRAWINGS

The drawings show embodiments of the present invention

DETAILED DESCRIPTION OF THE PREFERRED EMBODIMENTS

Figure 23:
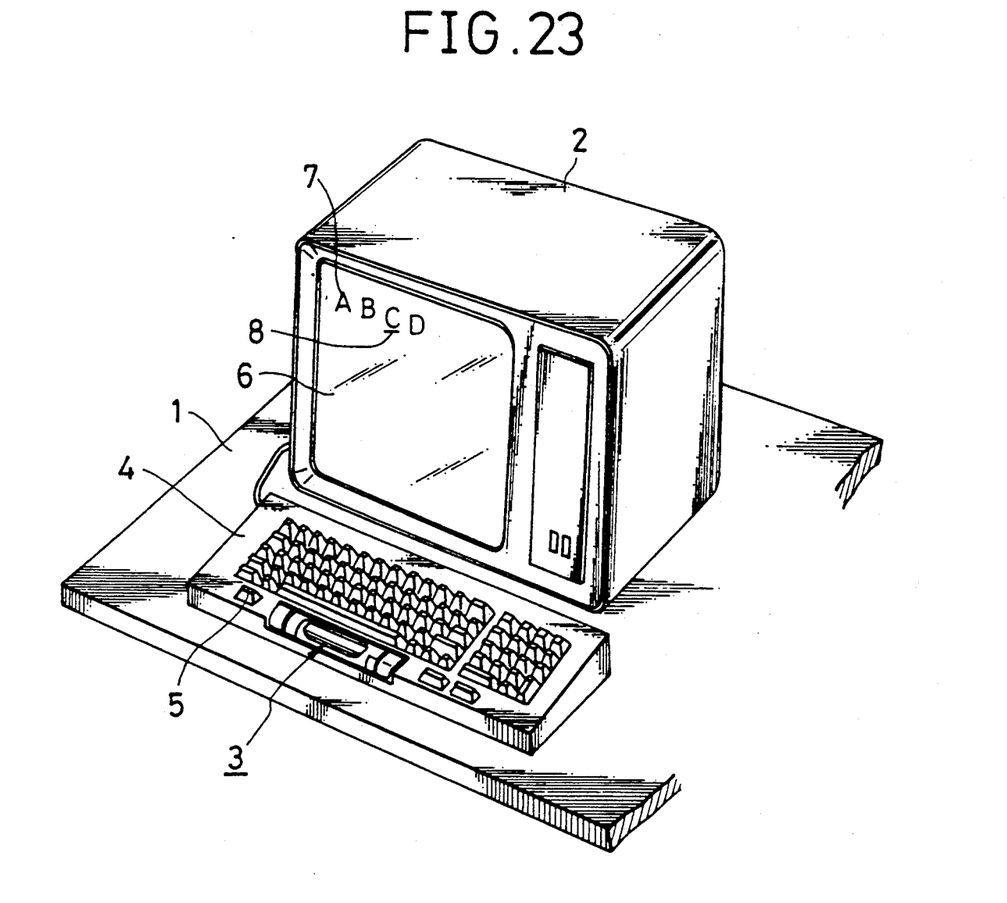
FIG. 23 is a perspective view of a graphic display device including an X-Y direction input device.

Referring to FIG. 23, which is a perspective view of the whole graphic display device including an X-Y direction input device according to one embodiment of the present invention, on a table 1 are placed a display device 2 provided with a screen, a controller, a data channel and the like and a keyboard 4 provided with an X-Y direction input device. The keyboard 4 is provided so that by depressing a number of operation keys 5 disposed on the upper surface thereof, for example, a display pattern 7 such as a character, a figure or the like is displayed on a screen 6 or the desired calculation is effected. On the other hand, the X-Y direction input device 3 is provided to suitably move a cursor 8 displayed on the screen 6.

In FIGS. 1 to 7, reference numeral 9 designates a housing made of synthetic resin. A rectangular printe substrate 10 is screwed onto the undersurface of the housing 9. As shown in FIG. 8, circuit constituent parts including first, second, third, fourth and fifth push switches 11 to 15 are fixed to the print substrate 10 by soldering, the first to fifth push switches 11 to 15 being arranged in order from the left hand in FIG. 8 on the upper surface of the print substrate 10.

Figure 9:
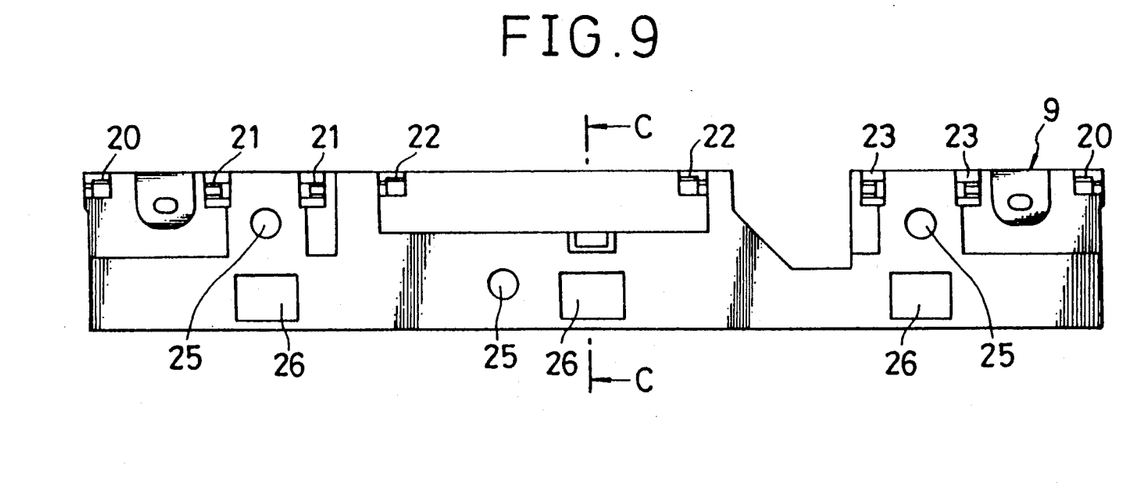
FIG. 9 is a plan view of a housing.
Figure 10:
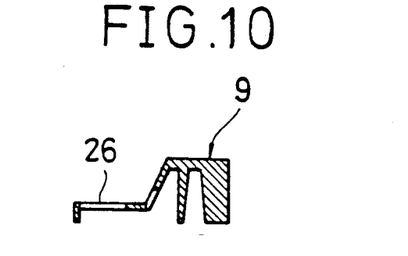
FIG. 10 is a sectional view taken on line C—C of FIG. 9.

FIG. 9 is a plan view of the housing 9, and FIG. 10 is a sectional view taken on line C—C of FIG. 9. As will be apparent from these figures, plural sets of support shafts 20, 21, 22 and 23 are formed on one and the same axis on shoulder portions at the rear of the housing 9. A guide member 16, a first key top 17 and a second key top 19 are rotatably supported on the bearings 20 on opposite ends, left bearings 21, central bearings 22 and right bearings 23, respectively. The housing 9 is formed at stepped portions with three circular holes 25 and three slots 23, the second to fourth push switches 12, 13 and 14 being inserted into these slots 26 and projected upwardly.

Figure 5:
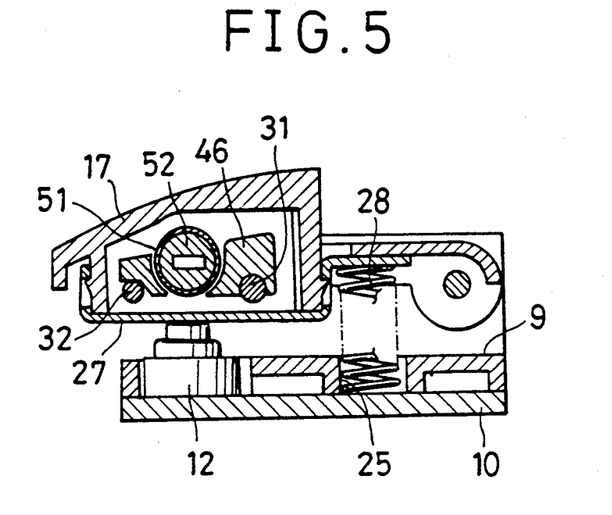
FIG. 5 is an enlarged sectional view taken on line A—A of FIG. 1.

As will be apparent from FIG. 5, the first key top 17 formed of synthetic resin is snap-connected to a receiving plate 27 formed by bending a metal plate, between which is space for receiving a slider and a cylinder which will be described later. A spring 28 extending through said circular hole 25 is interposed between the receiving plate 27 and the print substrate 10 so that when the first key top 17 is pressed and rotated against the spring 28, the second push switch 12 is pressed by the lower surface of the receiving plate 27 and turned on or off. The second key top 19 is likewise constructed so that when the second key top 19 is depressed and rotated, the fourth push switch 14 is turned on or off.

Figure 7:
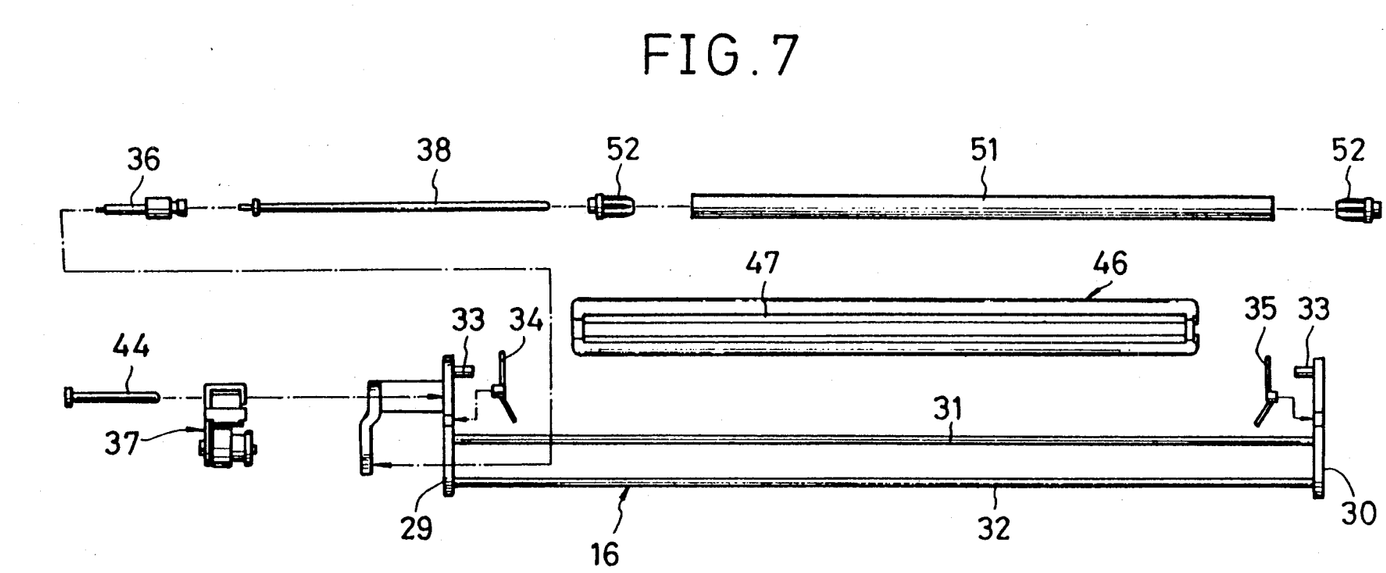
FIG. 7 is a plan view showing, in an exploded form, a power transmission system in a Y-direction.
Figure 8:
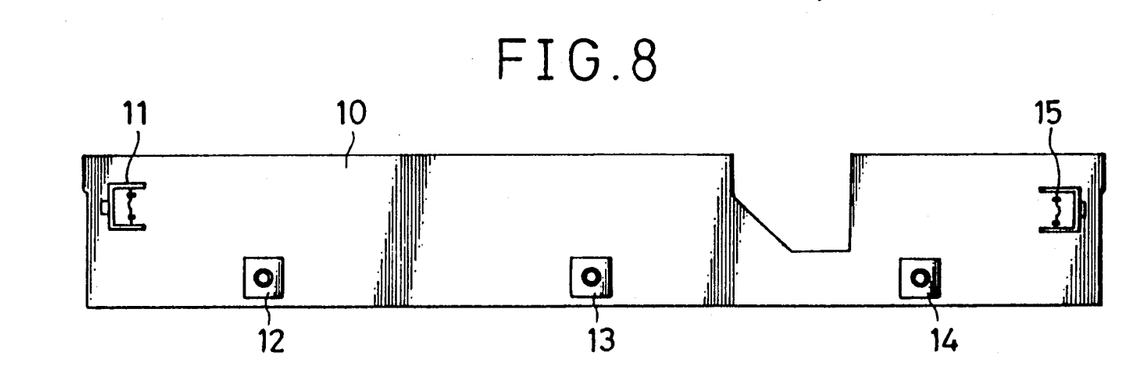
FIG. 8 is a plan view of a print substrate.

As will be apparent from FIG. 7, the aforesaid guide member 16 comprises both left and right support plates 29, 30 and first and second guide shafts 31, 32 made of metal mounted between these support plates 29, 30, both the support plates 29, 30 having support shafts 33 carried on said bearings 20. First and second pressing pieces 34, 35 subjected to forming in the shape of are supported rotatably about a bended portion on the upper ends of both the support plates 29, 30, one end of the first pressing piece 34 and one end of the second pressing piece 35 being opposed to the first push switch 11 and the fifth push switch, respectively.

Figure 11:
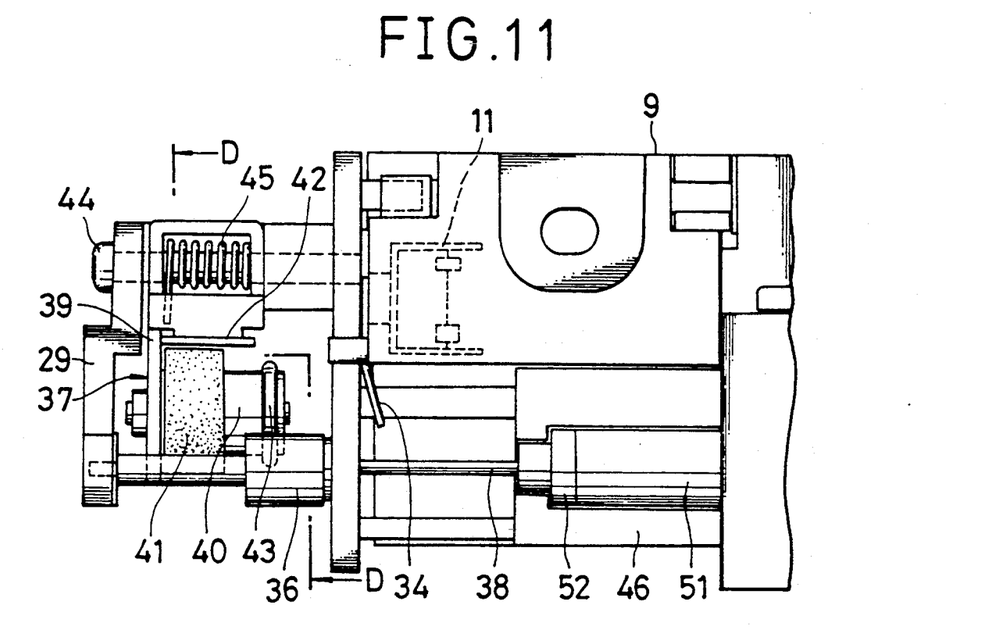
FIG. 11 is a plan view of essential parts of a power transmission mechanism in a Y direction.
Figure 12:
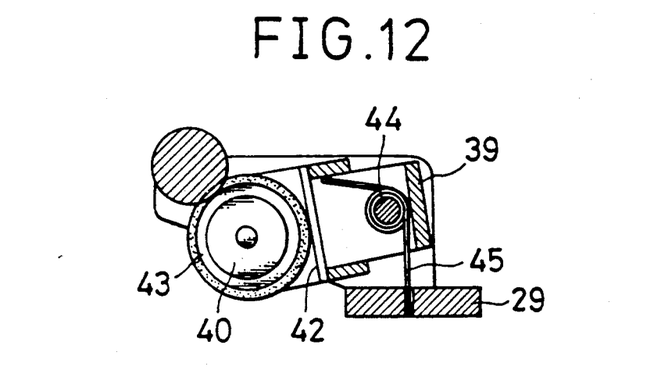
FIG. 12 is a sectional view taken on line D—D of FIG. 11.

FIG. 11 is a plan view of essential parts showing a power transmission system in a Y direction, and FIG. 12 is a sectional view taken on line D—D of FIG. 11. As will be apparent from these figures, a drive shaft 36 and a first encoder 37 are rotatably supported on the support plate 29, and a drive shaft 38 having a rectangular section is pressed and secured to the drive shaft 36. The first encoder 37 is composed of a frame 39, a cylindrical rotational member 40 supported on the frame 39, a plastic magnet 41 molded around the rotational member 40 and a magnetic resistance sensor 42 opposed to the plastic magnet 41 with a fixed gap left and adhered to the frame 39. A flexible connector not shown is connected to an output terminal of the magnetic resistance sensor 42. A magnetic pole is magnetized in a circumferential direction of the plastic magnet 41, and on the other hand, a plurality of magnetic resistors are disposed in fixed pitch on the magnetic resistance sensor 42. A rubber ring 43 is mounted on the rotary member 40. The thus structured first encoder 37 is supported on the support plate 29 rotatably about a support shaft 44 which extends through the frame 39. The rubber ring 43 is placed in resilient contact with the peripheral surface of the drive shaft 36 by the bias force of a torsional coil spring 45 wound about the support shaft 44.

Turning again to FIG. 1, a slider 46 made of synthetic resin is placed on both guide shafts 31 and 32 of the guide member 16, the slider 46 being guided by a first guide shaft 31 and reciprocated in a longitudinal direction (lateral direction in FIG. 1).

Figure 13:
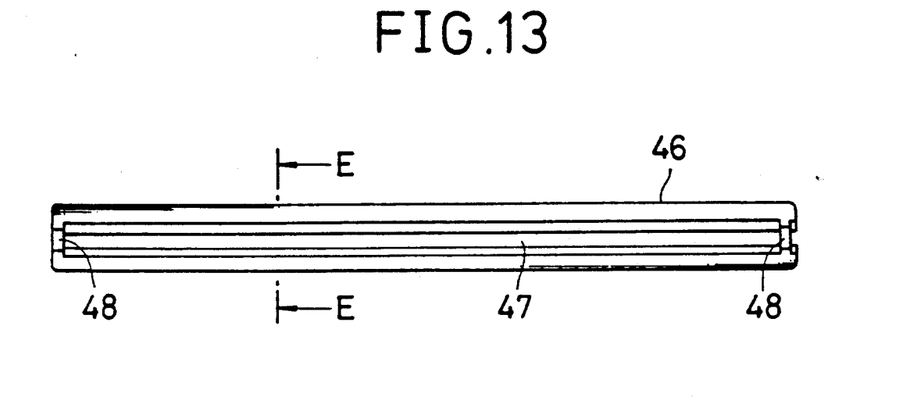
FIG. 13 is a plan view of a slider.
Figure 14:
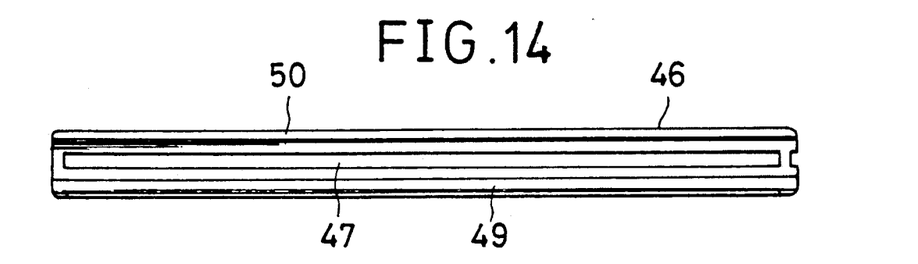
FIG. 14 is a bottom view of the same.
Figure 15:
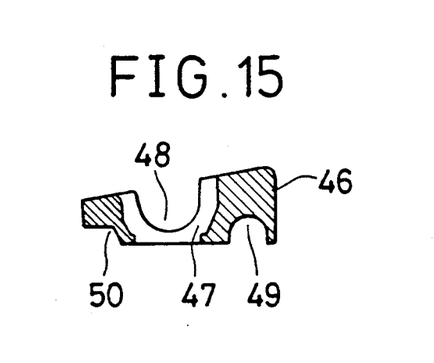
FIG. 15 is an enlarged sectional view taken on line E—E of FIG. 13.

FIG. 13 is a plan view of the slider 46, FIG. 14 is a bottom view of the same, and FIG. 15 is an enlarged sectional view taken on line E—E of FIG. 13. As will be apparent from these figures, the slider 46 is formed in the top surface thereof with a longitudinally extending retaining groove 47 having a semi-circular section and a small-diameter bearing groove 48 continuous to both ends of the retaining groove 47. On the other hand, the slider 46 is formed in the back surface with a guide groove 49 having a semi-circular section extending in a longitudinal direction through said retaining groove 47 and a stepped sliding surface portion 50. The guide groove 49 and the sliding surface portion 50 being placed on the first guide shaft 31 and the second shaft 32, respectively, and being moved while being guided by the first shaft 31 (see FIGS. 5 and 6).

A cylinder 51 is rotatably supported in the retaining groove 47 of the slider 46. This cylinder 51 is formed from a hollow aluminum, the surface of which is applied with processing to have a crepe surface, a rugged surface, etc. As shown in FIG. 7, a transmission shaft 52 made of plastic resin is pressed in secured to both ends of the cylinder 51 so that the transmission shaft 52 is inserted into the bearing groove 48 of the slider 46 from the top whereby the cylinder 51 is rotatably retained on the slider 46, in which state, the upper half of the cylinder 51 is projected from the retaining groove 47 of the slider 46 and can be rotated from outside. Although not appearing in FIG. 7, the transmission shaft 52 is formed with an axial hole having a rectangular section. The drive shaft 38 extends through said axial hole to reach the interior of the cylinder 51, the drive shaft 38 and the transmission shaft 52 being spline-coupled. Accordingly, even if the cylinder 51 is slid along the lengthwise thereof, the drive shaft 38 and the cylinder 51 are merely relatively displaced but when the cylinder 51 is rotated, the turning force thereof is transmitted to the drive shaft 38 through the transmission shaft 52 to rotate the plastic magnet 41 of the first encoder 37.

Figure 16:
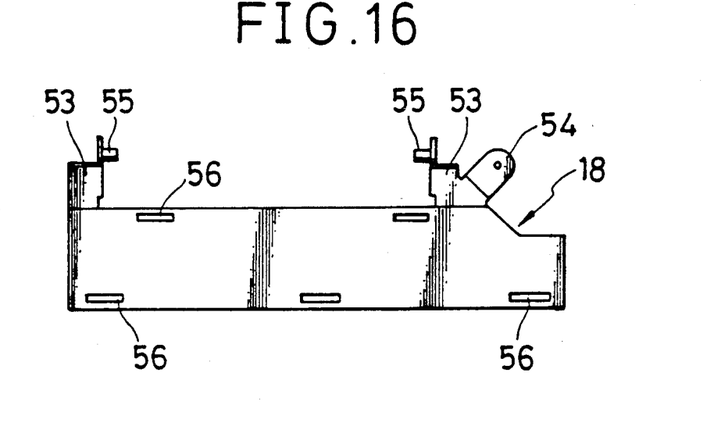
FIG. 16 is a plan view of a drive plate.
Figure 17:
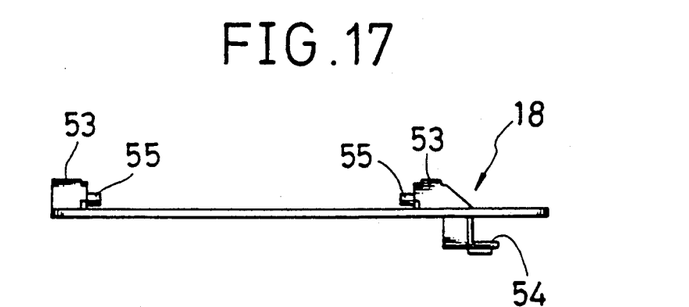
FIG. 17 is a front view of the same.
Figure 18:
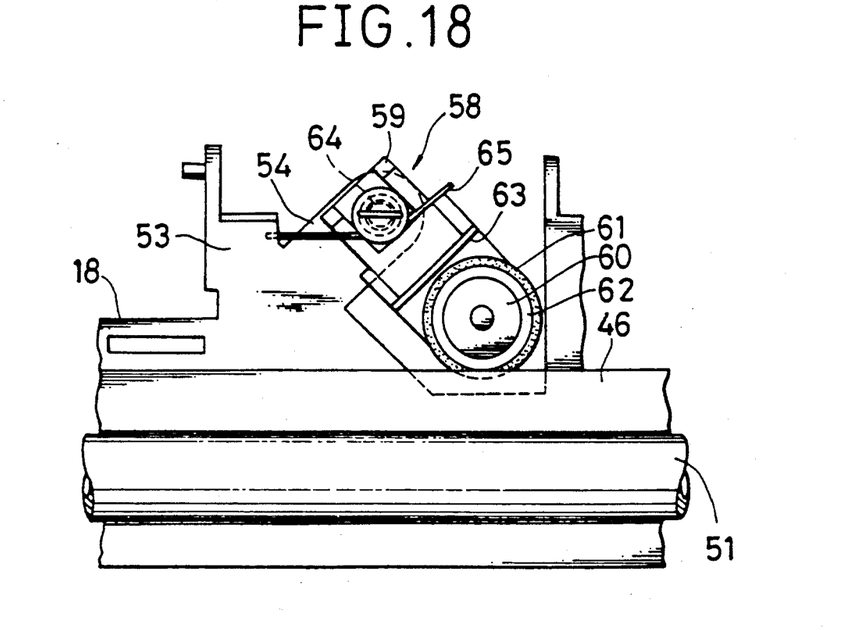
FIG. 18 is a plan view of essential parts of a power transmission mechanism in an X-direction.

FIG. 16 is a plan view of the drive plate 18, FIG. 17 is a front view of the same, and FIG. 18 is a plan view of essential parts showing a power transmission system in a Y direction. As will be apparent from these figures, the drive plate 18 is formed on the rear surface with a pair of obliquely upwardly extending inclined portions 52 and an L-shaped receiving portion 54 hung from one inclined portion 53. A support shaft 55 supported on the bearings 32 is mounted on both the inclined portions 53. A plurality of engaging holes 56 are formed in a flat portion on the front side of the drive plate 18. As will be apparent from FIG. 6, a cover 57 made of synthetic resin is snap-coupled to the drive plate 18, and the slider 46 and the cylinder 51 are arranged within a space defined therebetween. A spring not shown extending through said circular hole 25 is interposed between the drive plate 18 and the print substrate 10 so that when the drive plate 18 is rotated against the spring, the third push switch 13 disposed thereunder is switched to be turned on or off. As the member for rotating the drive plate 18, the cover 57 snap-coupled to the drive plate 18 as well as the slider 46 or cylinder 51 arranged therebetween may be utilized.

As will be apparent from FIG. 16, a second encoder 58 is rotatably supported on a receiving portion of the drive plate 18. Similarly to the aforementioned first encoder 37, the second encoder 58 is composed of a rotary member 60 supported on a frame 59, a plastic magnet 61 and a rubber ring 62 mounted on the rotary member 60 and a magnetic resistance sensor 63 adhered to the frame 59, a flexible connector not shown being connected to the magnetic resistance sensor 63. The second encoder 58 is rotatably supported on a support shaft 64 which extends through the frame 59 and is mounted on the receiving portion 54, the rubber ring 62 being placed in resilent contact with the rear side of the slider 46 by the bias of a torsional coil spring 65 wound about the support shaft 64.

Figure 19:
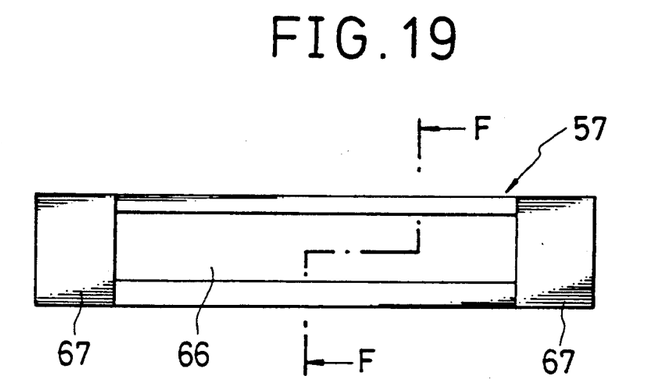
FIG. 19 is a plan view of a cover.
Figure 20:
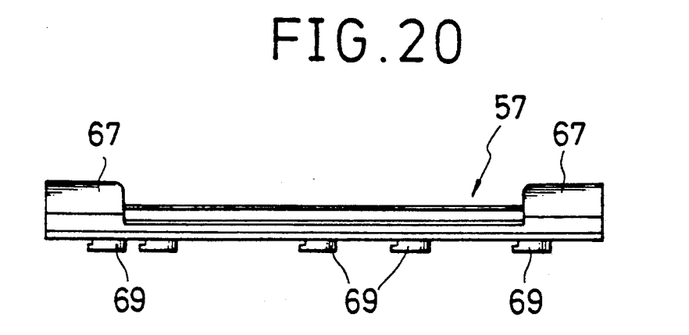
FIG. 20 is a front view of the same.
Figure 21:
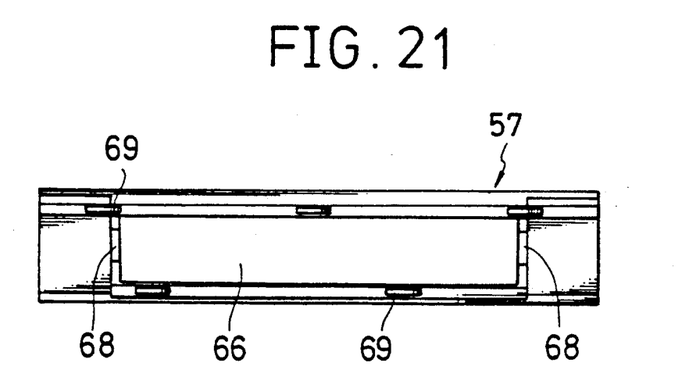
FIG. 21 is a back view of the same.
Figure 22:
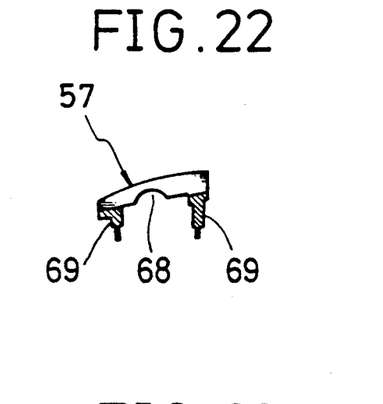
FIG. 22 is a sectional view taken on line f-F of FIG. 19.

FIG. 19 is a plan view of the cover 57, FIG. 20 is a front view of the cover, FIG. 21 is a rear view of the cover 57, and FIG. 22 is a sectional view taken on line F—F of FIG. 19. As will be apparent from these figures, the cover 57 is formed in the center thereof with an operating hole 66, and knobs 67 are projected on both longitudinal ends through the operating hole 66.

The knobs 67 are formed in the back surfaces thereof with retaining grooves 68 so as to cross the operating hole 66, a plurality of L-shaped snap feet 69 are hung on the back surface of the cover 57. In the thus structured cover 57, each of the snap feet 69 is snapped into each of engaging holes 56 of the drive plate 18 whereby it is made integral with the drive plate 18, and a slider 46 and a cylinder 51 are retained between the integrated drive plate 18 and the cover 57. In this state, a part of the slider 46 and the cylinder 51 is exposed from the operating hole 66, the cylinder 51 being rotatably retained between the retaining grooves 47 and 68 of the slider 46 and the cover 57, respectively (see FIG. 6).

Among the constituent members of the aforementioned X-Y direction input device 3, constituent parts except the first and second key tops 17, 19 and the cover 57 are received into the casing of the keyboard shown in FIG. 23, and a part of the slider 46 and the cylinder 51 is exposed from the operating hole 66 of the cover 57.

Figure 1:
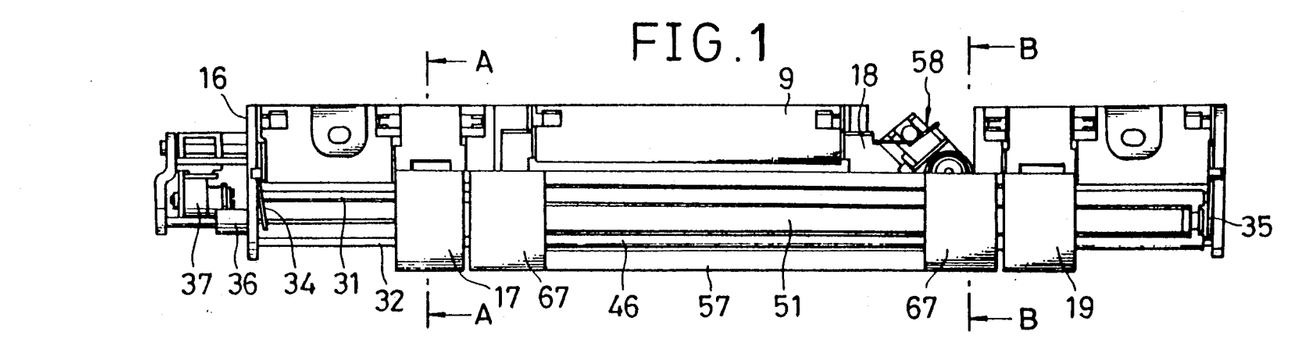
FIG. 1 is a plan view showing the whole construction of an X-Y direction input device.
Figure 2:
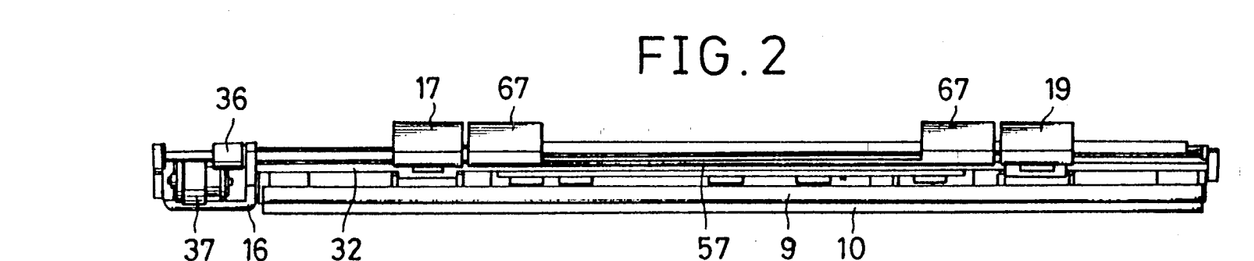
FIG. 2 is a front view of the same.
Figure 3:
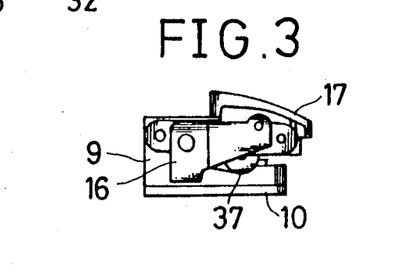
FIG. 3 is a left side view of the same.
Figure 4:
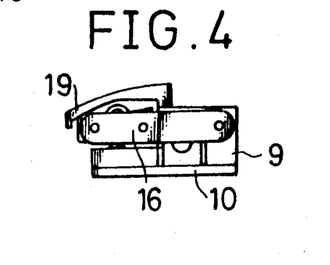
FIG. 4 is a right side view of the same.
Figure 6:
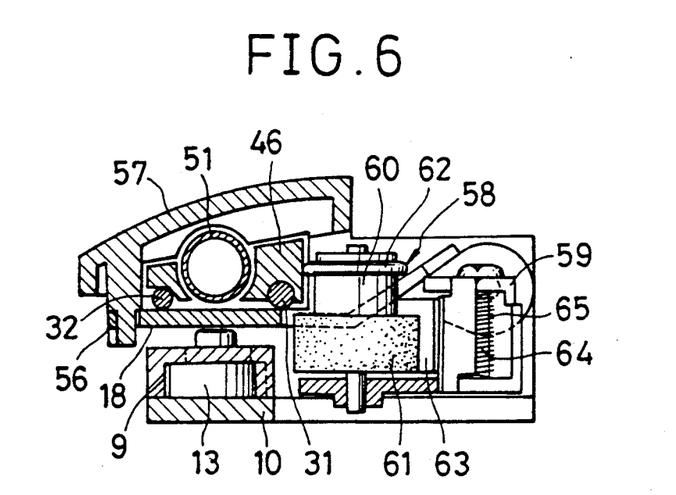
FIG. 6 is an enlarged sectional view taken on line B—B of FIG. 1.

In the thus constructed X-Y direction input device 3, when the slider 46 or the cylinder 51 exposed into the operating hole 66 of the cover 57 is slid in a lateral direction of FIG. 1 by a finger, the slider 46 is guided by the first guide shaft 31 and smoothly slid with an extremely small contact resistance on both the guide shafts 31 and 32. When the slider 46 rotates, the rubber ring 62 placed in resilient contact with the rear side of the slider 46 rotates, as shown in FIGS. 6 and 18, and the rotation is transmitted to a rotary member 60 of the second encoder 58. When the rotary member 60 rotates and the plastic magnet 61 rotate in association therewith, the resistance of each magnetic resistor element in the magnetic resistance sensor 63 varies, and therefore, a sliding amount of the slider 46, in other words, an amount of displacement in the X direction of the slider 46 is detected. It is to be noted that since the drive shaft 38 and the cylinder 51 are merely relatively moved during the movement of the slider 46, both the drive shaft 36 and the rotary member 40 of the first encoder 37 are not rotated.

On the other hand, when the cylinder 51 exposed into the operating hole 66 of the cover 57 is moved up and down in FIG. 1 by a finger of an operator, the cylinder 51 rotates about the bearing groove 48 of the slider 46. When the cylinder 51 rotates, the drive shaft 38 spline-coupled to the transmission shaft 52 of the cylinder 51 and the drive shaft 36 rotate, rotation of which is transmitted to the rotary member 40 of the first encoder 37 through the rubber ring 43 placed in resilient contact with the drive shaft 36. When the rotary member 40 rotates and the plastic magnet 41 rotates in association therewith, the resistance of each magnetic resistance element in the magnetic resistance sensor 42 varies, and therefore, an amount of rotation of the cylinder 51, in other word, an amount of displacement in a Y-direction of the cylinder 51 is detected by the first encoder 37.

Detection signals of the first and second encoders 37 and 58 are subjected to processing of waveform by an operational circuit on the print substrate 10 through a flexible connector not shown, and further inputted into a controller of the display device 2 through signal lines, which are processed in signal whereby the cursor 8 on the screen 6 can be moved to the position as desired by the operator. It is to be noted that the slide operation of the slider 46 and the rotational operation of the cylinder 51 can be of course performed mutually independently and can also be performed simultaneouly by both hands, and therefore, the cursor 8 can not only be moved up and down but also obliquely.

When in the state where the cursor 8 on the screen 6 is moved to a fixed position, the knob 67 (or the slider 46 or the cylinder 51 exposed into the operating hole 66 of the cover 57) of the cover 57 is depressed, the drive plate 18 integral with the cover 57 is rotated counterclockwise in FIG. 6 about the bearing 22 of the housing 9 whereby the third push switch 13 is turned on, and the position of the cursor 8 is inputted in response to the on-signal of the third push switch 13. Thus, the menu corresponding to the position of the cursor is displayed on the screen 6. In this operation, the slider 46 held between the cover 57 and the drive plate 18 and the guide member 16 for guiding the cylinder 51 and the slider 46 are also rotated counterclockwise in FIG. 6 about the bearing 20. However, the first encoder 37 is supported on the support plate 29 of the guide member 16 and is rotated integral with the drive shaft 36 splinecoupled to the cylinder 51, whereas the second encoder 58 is supported on the receiving portion 54 of the drive plate 18, and therefore, there is no relative displacement between the cylinder 51 and the first encoder 37 and between the slider 46 and the second encoder 58. On the other hand, when the first or second key top 17, 19 is depressed and rotated, the second or fourth push switch 12, 14 is turned on by the receiving plate 27 integral therewith, and the selected menu is cancelled by the on-signal of the push switches 12, 14.

In movement and control of the cursor 8, the relative position between both the encoders 37, 58 and the cursor 8 is sometimes deviated due to a mechanical error (for example, slip of the encoder) within the power transmission system from the cylinder 51 or the slider 46 to the encoders 37, 58 and an electric error such as erroneous occurrence of an encoder pulse. In this case, since the rotation of the cylinder 51 is endless, the first encoder 37 for detecting an amount of displacement in a Y-direction causes no problem even if the aforesaid errors should occur. By rotating the cylinder 51 through a predetermined amount, the cursor 8 can be moved to positions of both ends in a Y direction (vertical direction) on the screen 6.

On the other hand, since the slide amount of the slider 64 is limited, when the aforesaid errors occur in the second encoder 58 for detecting the amount of displacement in an X direction, there occurs an inconvenience such that the cursor 8 cannot be moved to the end on the left hand of the screen 6, for example, despite the fact that the slider 46 is moved to the position of the end on the left hand in FIG. 1. In view of this, in the present invention, for overcoming such an inconvenience, the first or fifth push switch 11, 15 is turned on at positions of both ends along the sliding direction of the slider 46, and the cursor 8 is positioned to both ends in an X direction (lateral direction) of the screen by the on-signal of the push switch 11, 15. That is, when the slider 46 is slidably moved leftward in FIG. 1 to arrive at the position of the left end, the left end of the slider 46 comes into contact with one end of the first pressing piece 34 to cause it to rotate clockwise, and the first push switch 11 is pressed against the other end of the first pressing piece 34 and turned on. Conversely, when the slider 46 is slidably moved rightward in FIG. 1 and the slider 46 arrives at the position of the right end, the right end of the slider 46 comes into contact with one end of the second pressing piece 35 to cause it to rotate counterclockwise, and the fifth push switch 15 is pressed against the other end of the second pressing piece 35 and turned on.

During the repeated operation as described above, the slider (made of synthetic resin) 46 and the guide member (made of metal) 16, which are formed of different material and has a difference degree of shrinkage when the temperature of the environment varies. In this case, the slider 46 is supported on the first guide shaft 31 but is merely placed on the second guide shaft 32. Therefore, for example, in FIG. 6, where an elongation of width of the slider 46 is greater than an elongation of distance between both the guide shafts 31 and 32, a difference in elongation therebetween is absorbed because a contact point between the slider 46 and the second guide shaft 32 is slightly deviated rightward in FIG. 6. As described above, the slider 46 relies on one first guide shaft 31 as a guide shaft and is free from the other second guide shaft 32, and therefore, the slider 46 can be always slidably operated smoothly irrespective of a variation in temperature of the environment.

As described above, in the aforementioned embodiment, the X-Y direction input device 3 is incorporated into the keyboard 3 to provide an integral structure. Therefore, the operator can perform both the input operation of the operation key 5 and the control operation of the cursor 8 by the slider 46 and the cylinder 51 on the keyboard 4, thus providing a graphic display device having an extremely good operability. Moreover, the exclusive-use space, which has been required for the X-Y direction input device called "mouse", is not required, and therefore, an area occupied by the X-Y direction input device occupied in the graphic display device can be reduced.

Furthermore, the third push switch 13 for inputting the position of the cursor 8 is turned on by pressing not only the cover 57 but the slider 46 held between the cover 57 and the drive plate 18 or the cylinder 51 held on the slider to rotate the drive plate 18. Therefore, the cover 57, the slider 46 or the cylinder 51 may have the function as the keytop for actuating the third push switch 13. Therefore, the operator can operate the slider 46 or the cylinder 51 by his finger to move the cursor to a suitable position, and thereafter place the finger on the slider 46 or the cylinder 51 to input the position of the cursor 8 to select the desired menu.

Moreover, in operation of the third push switch 13, the power transmission system from the cylinder 51 to the first encoder 37 is rotated integral with the guide member 16, whereas the power transmission system from the slider 46 to the second encoder 58 is rotated integral with the drive plate 18. Therefore, it is not necessary to provide a mechanism for absorbing a displacement during oscillation on these power transmission systems, and the power transmission mechanism can be extremely simplified.

While in the above-described embodiment, a description has been made of the case where the magnetic type first encoder 37 and the magnetic second encoder 58 have been used as the rotation detection means for detecting the rotation of the cylinder 51 and the slide detection mean for detecting the movement of the slider 46, respectively, it is to be noted that rotary type electric parts such as other optical or mechanical encoders or potentiometers, etc. in place of these magnetic type encoders 37 and 58 may be used.

As described above, according to the present invention, the rotation operating member and the slide operating member may have the function as the keytop for actuating the switches in addition to the function of controlling position of the cursor and the power transmission systems from the rotation operating member to the first rotary type electric parts and from the slide operating member to the second rotary type electric parts may be simplified. It is therefore possible to provide an X-Y direction input device having a good operability and less malfunction.

What is claimed is:

1. An X-Y direction input device comprising a rotatable rotation operating member, a first rotary type electric part for detecting a rotational amount of said rotation operation member, a slide operating member capable of reciprocation in a direction of a rotational axis of said rotation operating member, and a second rotary type electric part for detecting an amount of movement of the slide operating member, in which a cursor displayed on a display device is moved in a suitable direction according to operating amounts of said rotation operating member and said slide operating member, said first rotary type electric part and said slide operating member holding said rotation operating member are mounted on a first driving member, a driving shaft spline coupled to said rotation operating member is supported at said first driving member, said second rotary type electric part having the rotation operating shaft resiliently biased to said slide operating member is mounted on a second driving member, and said first and second driving members are oscillatably supported and said first and second driving members are oscillated to operate a switch.

2. An X-Y direction input device according to claim 1 in which said rotation operating member and said slide operating member are depressed to cause said first and second driving members to be similarly oscillated to operate a switch.

3. An X-Y direction input device according to claim 1 in which said rotation operating member is depressed to cause said first and second driving members to be similarly oscillated to operate a switch.

4. An X-Y direction input device according to claim 1 in which said slide operating member is depressed to cause said first and second driving members to be similarly oscillated to operate a switch.

* * * * *